United States Patent [19]
Anderson

[11] Patent Number: 4,541,685
[45] Date of Patent: Sep. 17, 1985

[54] OPTICAL CONNECTOR SLEEVE

[75] Inventor: Jerry M. Anderson, Austell, Ga.

[73] Assignee: AT&T Bell Laboratories, Murray Hill, N.J.

[21] Appl. No.: 472,849

[22] Filed: Mar. 7, 1983

[51] Int. Cl.$^4$ .............................................. G02B 7/26
[52] U.S. Cl. ............................ 350/96.21; 350/96.20
[58] Field of Search ............... 350/96.20, 96.21, 96.22

[56] References Cited

U.S. PATENT DOCUMENTS

| | | | |
|---|---|---|---|
| 3,734,594 | 5/1973 | Trambarulo | 350/96 B |
| 4,081,208 | 3/1978 | Meade | 350/96.20 |
| 4,101,198 | 7/1978 | Heldt | 350/96.20 |
| 4,107,242 | 8/1978 | Runge | 264/1 |
| 4,185,883 | 1/1980 | Chown et al. | 350/96.20 |
| 4,193,665 | 3/1980 | Arnold | 350/96.22 |
| 4,221,461 | 9/1980 | Bair | 350/96.20 |
| 4,239,333 | 12/1980 | Dakss et al. | 350/96.21 |
| 4,273,412 | 6/1981 | Hillegonds | 350/96.20 |
| 4,354,731 | 10/1982 | Mouissie | 350/96.21 |
| 4,406,515 | 9/1983 | Roberts | 350/96.21 |

FOREIGN PATENT DOCUMENTS

| | | | |
|---|---|---|---|
| 2701436 | 7/1977 | Fed. Rep. of Germany | 350/96.21 |
| 54-116943 | 9/1979 | Japan | 350/96.21 |

OTHER PUBLICATIONS

*Strength of Materials*, Third Edition, Part I, S. Timoshenko, 1955, pp. 391-393.
Kasen Nozzle Manufacturing Company, Ltd., Kasen International Corporation, Japan, product literature (6 sheets).
"Design of a Fiberoptic Connector", *Fiberoptic Technology*, L. M. Borsuk, Aug. 1982, pp. 93-97.

Primary Examiner—John Lee
Attorney, Agent, or Firm—James H. Fox

[57] ABSTRACT

Cylindrical optical fiber connector plugs are joined using a split sleeve to align the axes of the plugs. The inventive sleeve exerts a substantially uniform pressure around the circumference of the plugs for improved alignment of the fibers therein. In one embodiment, the uniform pressure is achieved by varying the thickness of the sleeve around its circumference. Low-cost molded sleeves of the inventive design have achieved lower-loss connections than a machined metal sleeve.

9 Claims, 9 Drawing Figures

MAXIMUM GAP = 0.07 μm 80-mil LEADING-EDGE SEPARATION
MAXIMUM GAP LESS THAN 0.1 μm 80-mil LEADING EDGE SEPARATION
MAXIMUM GAP = 0.84 μm

OPTICAL CONNECTOR SLEEVE

BACKGROUND OF THE INVENTION

1. Field of the Invention

This invention relates to an improved split seeve for use with optical fiber connectors.

2. Description of the Prior Art

Optical fiber connectors are used to optically couple one optical fiber to another optical fiber, or an optical fiber to a device, such as a light-emitting diode, laser, or photodetector, among others. The fiber connector must maintain good alignment of the fiber in order to reduce optical losses to a minimum. In addition, it is desirable that the connector be low cost and readily producible. It should furthermore be easy to connect and disconnect.

One successful connector design is the so-called "biconic connector," which provides good fiber alignment and ease of use; see, for example, U.S. Pat. No. 4,107,242, coassigned with the present invention. Other types of optical fiber connectors include those using cylindrical plugs that mate in a split cylindrical sleeve. In that technique, the plugs are typically inserted into the sleeve until the ends of the plugs touch, allowing for a low-loss connection between two fibers or between a fiber and an optical device.

SUMMARY OF THE INVENTION

I have invented an improved sleeve that is designed to maintain a substantially circular shape when cylindrical optical plugs are inserted therein. The inventive sleeve exerts a substantially uniform pressure around the circumference of the plugs, providing for improved alignment of the plugs, as compared to sleeves that do not maintain a uniform pressure. In one embodiment, the uniform pressure is achieved by varying the thickness of the sleeve around its circumference.

DETAILED DESCRIPTION

The following detailed description relates to an improved design for a split sleeve used for joining cylindrically shaped optical plugs. The plugs can be used to join two optical fibers or an optical fiber to an optical device; the term "optical plug" includes plugs used in either application.

Figure 1:
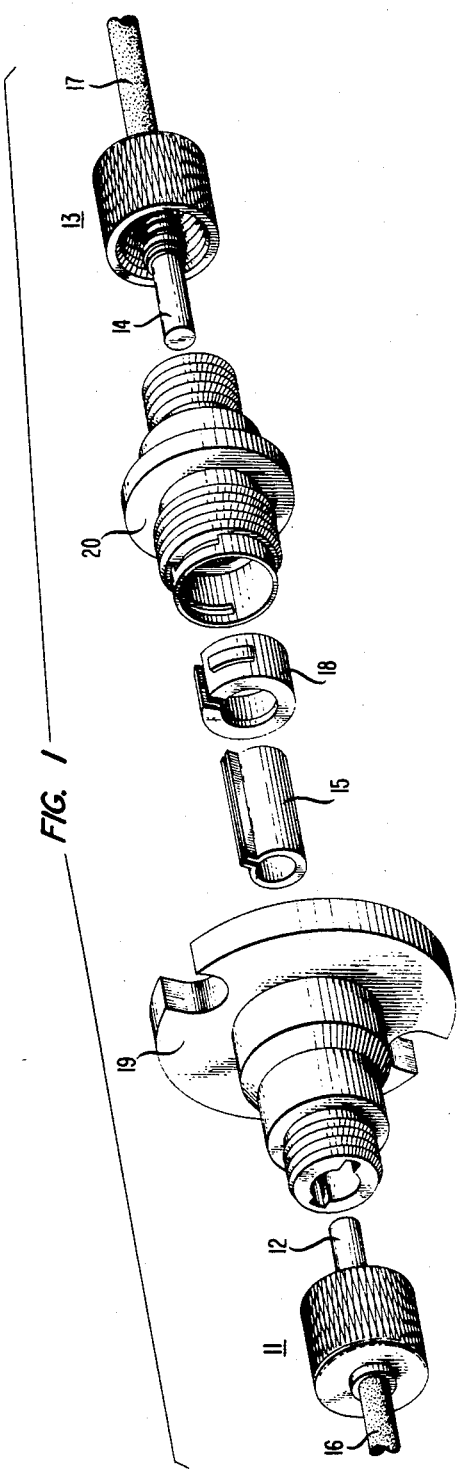
FIG. 1 shows a typical design of cylindrical plugs that are joined by means of a split sleeve.

Referring to FIG. 1, plug 11 is attached to a cable 16 having an optical fiber (not shown) therein. The optical fiber extends into the cylindrical portion 12 of the plug. The fiber typically extends slightly beyond the end of the cylindrical plug, and is desirably polished to obtain a substantially flat surface, according to prior art techniques. Similarly, plug 13, having cylindrical cylinder 14 thereon, is attached to cable 17 having an optical fiber therein. In making a connection between these fibers, the plugs are inserted into split sleeve 15 until the ends of the cylindrical portions 12 and 14 touch, or in some designs, are in close proximity. The ends of the fibers can be bare, or an index-matching fluid can be used to improve coupling between the fibers. In other cases, a compliant material is applied onto the ends of the fibers; see, for example, U.S. Pat. No. 4,221,461, coassigned with the present invention.

Figure 2:
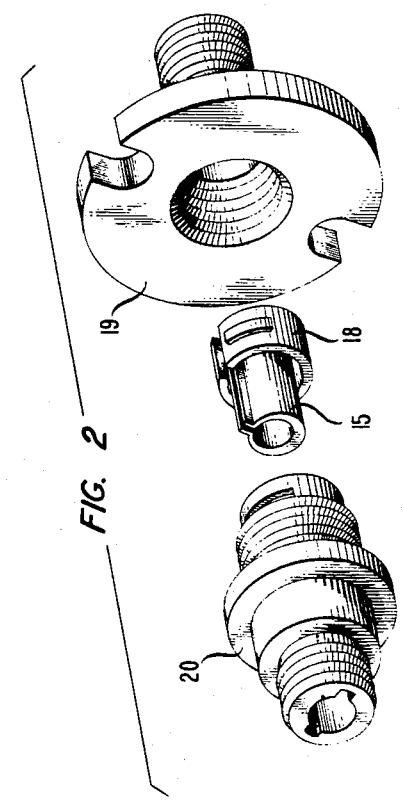
FIG. 2 shows a suitable connector assembly for use with cylindrical plugs and a split sleeve.

To obtain mechanical integrity, plugs 11 and 13 can be mounted in the threaded housings 19 and 20 shown in FIG. 1. The sleeve 15 is also mounted therein and is retained in housing 20 by plastic retaining ring 18. Housing 20 threads into housing 19, as shown in FIG. 2. Other configurations for the mechanical assembly of the connector plugs are possible, and do not form part of the present invention. The sleeve 15 is shown with a wall thickness varying according to the present technique. Prior art sleeves typically have a substantially constant wall thickness, producing an essentially cylindrical shape without plugs therein.

Contact between the sleeve and plugs is necessary to obtain proper alignment of the plugs. This is referred to in the art as an "interference fit." However, in obtaining the interference fit, the sleeve is necessarily slightly undersized; that is, having a slightly smaller initial diameter than the diameter of the cylindrical plugs that are to fit therein. The present invention relates to my discovery that a significant amount of optical losses in cylindrical sleeve type connectors is due to a nonuniform pressure being exerted on the cylindrical plugs by the sleeve. I have determined that this is due at least in part to the fact that when cylindrical plugs are inserted into a cylindrical sleeve, the sleeve deforms such that a circular cylinder is no longer obtained.

In the present invention, the alignment sleeve is designed to exert a more nearly uniform pressure around the circumference of the plugs inserted therein. This can be obtained, for example, by varying the thickness of the sleeve around the circumference of the sleeve, as explained further below.

An analysis that is useful for deriving an improved geometry is given below. However, other analyses can yield slightly different results, depending upon the assumptions used and the materials used to make the sleeve. The present invention does not depend upon the exact analysis used to obtain a more uniform pressure around the circumference of cylindrical plugs.

Figure 3:
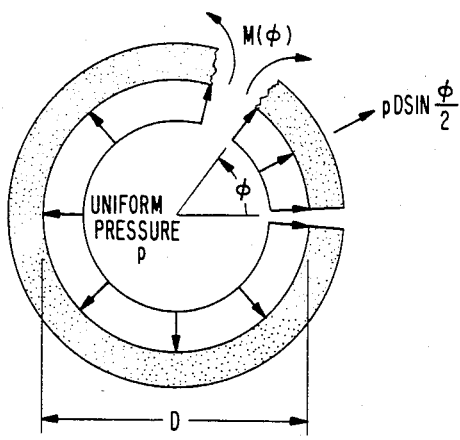
FIG. 3 shows a cross section of a sleeve having uniform wall thickness.

FIG. 3 shows a ring of uniform wall thickness opened by uniform pressure p. The assumption of uniform pressure allows simple expression of the bending moment M at any circumferential station measured by the angle $\phi$, where $\phi$ measures the angle from that station to the center of the cut. This assumption is also a desirable design feature for an alignment derivative of the retaining ring because it indicates a circumferentially unbiased tendency to maintain contact over the entire interface.

Regarding the equilibrium of a free-body segment of the ring in FIG. 3 that is separated from the remainder by a cut at $\phi$, a moment summation about the cut gives $$M(\phi) = \frac{pD^2}{2} \sin^2\left(\frac{\phi}{2}\right), \quad (1)$$

in which D is the inner diameter of the ring, and p is the pressure thereon. According to elementary bending theory, the principal change in curvature $\Delta\kappa_p$ is given by $$\Delta\kappa_p = \frac{M}{EI}, \quad (2)$$

in which E is the modulus of elasticity, and $$I = \frac{h^3}{12} \quad (3)$$

for a unit length of ring having local thickness h. Thus, $$\Delta\kappa_p = \frac{6pD^2}{Eh^3} \sin^2\left(\frac{\phi}{2}\right), \quad (4)$$

showing that a ring of constant thickness opened by uniform pressure has a change in curvature that varies around the circumference. This means, of course, that the circular inner circumference of such a ring does not simply deform into a larger circle.

Figure 4:
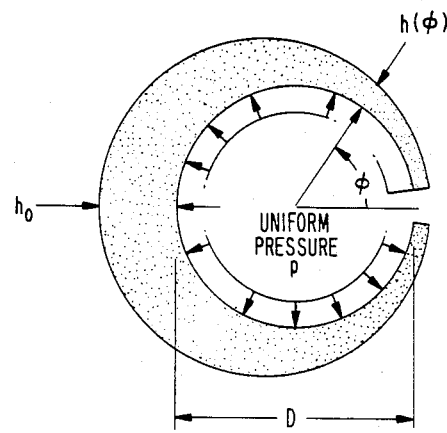
FIG. 4 shows a cross section of a split sleeve designed according to the present technique.

Equation (4), however, can be used to determine how the thickness should vary with $\phi$ to realize circle-to-circle deformation under uniform pressure; see, for example, *Strength Of Materials, Third Edition*, Part I, by S. Timoshenko, at pages 391-393 (D. van Nostrand Company, Inc., Princeton, N.J., 1955). If $$h^3 = h_o^3 \sin^2\left(\frac{\phi}{2}\right), \quad (5)$$

in which $h_o$ is the thickness opppsite the split, then Equation (4) becomes $$\Delta\kappa_p = \frac{6pD^2}{Eh_o^3}, \quad (6)$$

which is the desired result, i.e., a constant change in curvature. FIG. 4 shows a cross section of a split sleeve whose thickness is tailored in accordance with Equation (5). The change in curvature is given kinematically by $$\Delta\kappa_p = \frac{2}{D} - \frac{2}{D + \delta} \quad (7)$$

$$= \frac{2\delta}{D^2}$$

for a diametral interference $\delta$ far less than D. The "diametral interference" is defined as the increase of the diameter of the sleeve upon insertion of the plugs therein. Combining Equations (6) and (7) produces $$p = \frac{Eh_o^3}{3D^4} \delta. \quad (8)$$

while Equations (2) and (7), taken in conjunction with $$\sigma_{max} = \frac{Mh}{2I}, \quad (9)$$

show that the maximum bending stress is found opposite the split and is given by $$\sigma_{max} = \frac{Eh_o}{D^2} \delta. \quad (10)$$

Equation (8) is used to calculate the interface pressure, and Equation (10) is used to determine whether the corresponding interference is excessive. As a numerical example, for $h_o = 40$ mils (1.02 mm), D=100 mils (2.54 mm), $\delta = 0.6$ mils (15.2 μm), and a sleeve material for which $E = 2 \times 10^6$ psi $(1.4 \times 10^{10} N/m^2)$, Equation (8) predicts an interface pressure of 256 psi $(1.8 \times 10^6 N/m^2)$, and Equation (10) indicates an acceptably low strain level of 0.24%.

When thicknesses as great as 40 mils are considered with diameters as small as 100 mils, it is reasonable to question the validity of elementary formulas like Equations (2) and (9), which are limited in exact application to the pure bending of straight beams. What follows is a two-dimensional refinement accounting for initial curvature.

Figure 5:
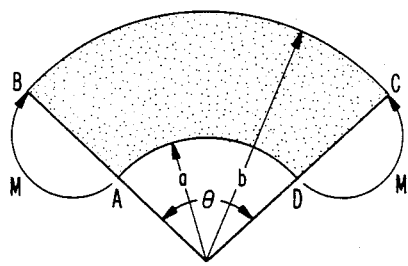
FIG. 5 shows bending of a thick curved beam.

FIG. 5 shows an annular segment of unit length whose respective inner and outer radii a and b are subtended by the angle $\theta$. The curved beam segment is bent my moments M at either end in such a way as to reduce the initial curvature. Assuming rigid-body restraints prohibiting the rotation of AB, it is known that CD rotates by an amount $4B\theta/E$, where $$B = \frac{2M(b^2 - a^2)}{N} \quad (11)$$

and $$N = (b^2 - a^2)^2 - 4a^2b^2\left(\ln \frac{b}{a}\right)^2. \quad (12)$$

Referring to the change in length of arc AD, $$a\theta(1 + \epsilon_\theta) = (a + \delta)\theta\left(1 + \frac{4B}{E}\right). \quad (13)$$

in which $\epsilon_\theta$ and $(a+\delta)$ are the extensional strain and radius of curvature, respectively, of the deformed arc. Since $\sigma_r$ vanishes on AD, the strain there for the case of plane stress is given by $$\epsilon_\theta = \frac{\sigma_\theta}{E} = -\frac{4M}{NE}\left(b^2 - a^2 - 2b^2 \ln \frac{b}{a}\right), \quad (14)$$

and Equations (11), and (13), and (14) upon combination and simplification lead to $$\frac{E\delta}{4a} = M \frac{b^2 - a^2 + 2b^2 \ln \frac{b}{a}}{N} \quad (15)$$

Equation (1) shows that the local moment is given by $$M = 2a^2 p \sin^2\left(\frac{\phi}{2}\right), \quad (16)$$

when bending is induced by uniform internal pressure p. Consequently, Equation (15) becomes $$\frac{E\delta}{8a^3 p} = \sin^2\left(\frac{\phi}{2}\right) \frac{(b^2 - a^2) + 2b^2 \ln\frac{b}{a}}{(b^2 - a^2)^2 - 4a^2 b^2 \left(\ln\frac{b}{a}\right)^2}, \quad (17)$$

upon substitution from Equations (12) and (16).

Equations (4) and (17) are analogous in that they both indicate how the thickness should be tailored to achieve circle-to-circle deformation under uniform pressure. Equation (17) is a refined version of Equation (4), accounting for substantial initial curvature, i.e., nonnegligible h/a ratios. In fact, Equation (4) can be recovered from Equation (17) by writing b=a+h and extracting the limiting form taken by Equation (17) for very small values of h/a.

Results computed using elementary formulas like Equations (4)–(10) are compared in Table 1, with those obtained using the more exact theory for the parameters given in the table heading. Differences in tailored thickness are as much as 15% in the thinner part of the cross section. The more exact theory predicts about a 5% higher uniform pressure for the same interference level. Because the distribution of bending stresses is nonlinear for a beam with initial curvature, the maximum extensional strain given by the refined formulas is fully 25% greater than that predicted by the elementary theory, but remains at an acceptably low level for virtually any material.

TABLE 1

| Given Parameters: | a = 50 mils (1.27 millimeters) |  |
|---|---|---|
|  | $h_o$ = 40 mils (1.02 millimeters) |  |
|  | E = 2 × 10⁶ psi (1.4 × 10¹⁰ N/m²) |  |
|  | $\delta$ = 0.6 mils (15.2 micrometers) |  |
|  | Elementary Bending Theory | Corrected For Initial Curvature |
| Thickness h (mils) at $\phi$ (degrees) = 180 | 40.0 | 40.0 |
| 170 | 39.9 | 39.9 |
| 160 | 39.6 | 39.5 |
| 150 | 39.1 | 38.9 |
| 140 | 38.4 | 38.1 |
| 130 | 37.5 | 37.0 |
| 120 | 36.3 | 35.6 |
| 110 | 35.0 | 34.1 |
| 100 | 33.5 | 32.3 |
| 90 | 31.7 | 30.4 |
| 80 | 29.8 | 28.2 |
| 70 | 27.6 | 25.8 |
| 60 | 25.2 | 23.3 |
| 50 | 22.5 | 20.5 |
| 40 | 19.6 | 17.5 |
| 30 | 16.2 | 14.3 |
| 20 | 12.4 | 10.7 |
| 15 | 10.3 | 8.8 |
| Uniform pressure p (psi) | 256 | 268 |
| Maximum strain $\epsilon_\theta$ at r = a | 0.24% | 0.31% |

To this point, only circumferential bending has been considered, and the prospect that it might necessarily be accompanied by longitudinal bending has been ignored. Such a view is not necessarily appropriate for alignment sleeves, since they require some length to perform their function. However, problems of coupled bending resulting from contact with interfering inner bodies are generally far too difficult to attack directly and deductively because the contact regions are not known in advance. This subsection describes a numerical approach based on the finite-element method.

Figure 6:
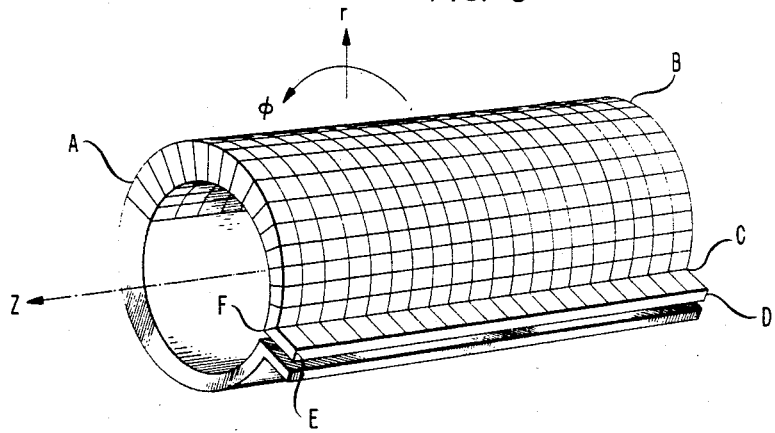
FIG. 6 shows a finite-element grid imposed upon a split sleeve.

FIG. 6 shows a sketch of a transfer-molded alignment sleeve. The thickness is circumferentially tailored in accordance with the more exact results of Table 1, except near the slot where flanges blend out of the body of the sleeve. While these optional flanges are a slight departure from the theoretical cross section, they assist in keeping the inner surface centered in a cylindrical housing and facilitate removing the molded sleeve from the mandrel. The length of the alignment sleeve is 400 mils.

A more or less uniform finite-element grid is shown in FIG. 6, superimposed on the upper half of the alignment sleeve. A cylindrical coordinate system is indicated, and key corners are given an alphabetical designation for later reference. The finite-element model consists of standard four-node rectangular shell elements that have both bending and membrane capabilities along with an option for specifying uniformly varying thickness within each element. The radial displacement of all nodes on surface ABCF is initially specified in a manner consistent with an internal diametral interference of 0.6 mils. Nodes along AB are restrained against displacement in the $\phi$ direction, but each is free to move axially, with the exception of the center node which is fixed to preclude rigid-body translation of the sleeve in the z direction. Clamping constraints along AB prohibit rotation of line elements there about the r and z axes. Except for the constraints noted, all nodes are free to move circumferentially and axially, and all line elements are free to rotate.

The results of the first execution are examined to determine nodal pressures corresponding to the imposed radial displacement. Nodes for which the computed pressure is negative are freed in the second execution; i.e., no radial displacement is imposed. Computed pressures for the second execution are examined, and the cycle is repeated until all nodes are either radially displaced the specified amount or free of pressure. Convergence ordinarily requires 10 to 20 executions.

Figure 7:
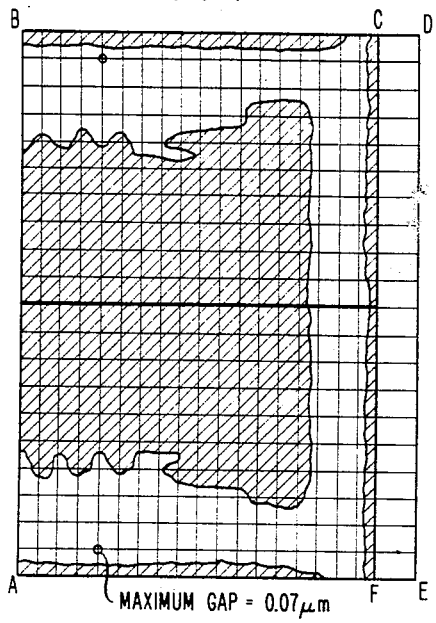
FIGS. 7 and 8 show contact interfaces for cylindrical plugs inserted in sleeves of the inventive design.

FIG. 7 is a plane presentation of the curved finite-element grid in FIG. 6; alphabetical designations correspond and should assist in orientation and visualization. For this computation, it was assumed that the cylindrical plugs touched inside the sleeve, with no separation between plug ends. Furthermore, equal plug diameters were assumed. Contact interfaces with a rigid interfering cylinder are shown shaded. The shape and extent of these interfaces do not depend on interference level or material characteristics. Longitudinal and circumferential gaps exist just inside the slot and sleeve ends, respectively. Such edge effects are clearly a threat to the alignment function of the sleeve if they are extensive or if the gap between the cylinder and deformed sleeve is excessive. In FIG. 7, the maximum gap is only 0.07 μm, but it should be noted that conditions of this first exercise are somewhat ideal in that there is no separation at the plug ends and the plugs have identical diameters. Practically speaking, some separation of leading edges must be allowed for a pedestal and a chamfer. Also some realistic diametral differences must be tolerated.

Figure 8:
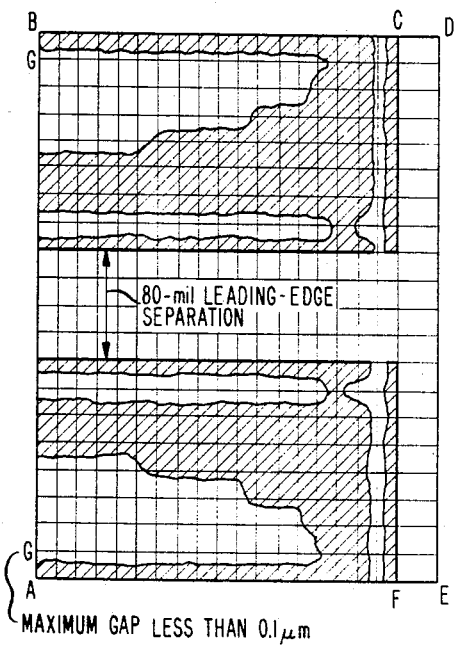

Shaded regions in FIG. 8 show computed contact interfaces between the alignment sleeve and two identical cylindrical plugs for which an 80 mil leading-edge separation is allowed. This would be the case, for instance, if each plug had a 20 mil high pedestal and a 20 mil longitudinally measured leading-edge chamfer. When these results are compared with those of FIG. 7, one predictably sees that the two added sharp edges introduce two additional edge zones where contact is lost. However, three virtually complete circumferential interfaces remain to align each plug, and the maximum gap scarcely increases.

Figure 9:
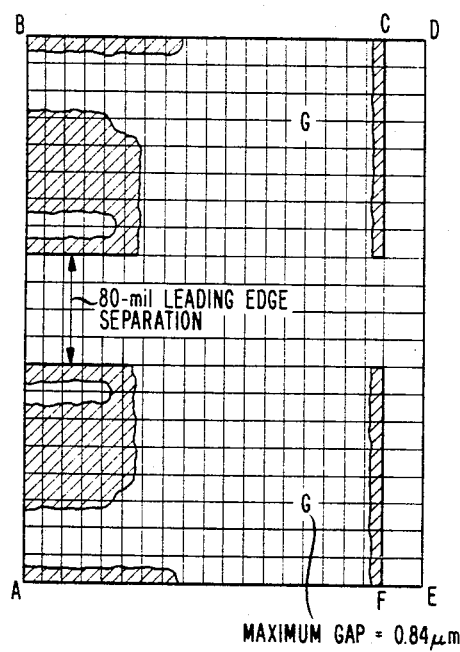
FIG. 9 shows contact interfaces for cylindrical plugs in a prior art uniform thickness sleeve.

While it might appear that substantial gaps still result from the improved design, a comparison with a sleeve of uniform thickness shows substantial improvement. FIG. 9 depicts results obtained for a sleeve having a uniform thickness of 24.4 mils—the average of the more exact extremes given in Table 1. Comparison of FIG. 8 and 9 shows that a substantial increase in contact area is achieved by the inventive design.

While the above analyses are useful to obtain the improved sleeve wall thickness, other analyses are possible. One approximation that is useful for simplifying mold designs for making the sleeve is that of two offset circles. The larger circle describes the outer surface of the sleeve, and the smaller circle describes the inner surface, as viewed in cross section. The value of $h_o$ given for the sleeve above can be used to determine the degree of offset of the circles. While this approximation is not as exact as those given above, it still provides improved plug alignment as compared to uniform thickness sleeves.

The above principles will be more fully explained by means of the following Example:

EXAMPLE

The present Example compares losses in connectors using the inventive sleeve with losses in connectors using a typical prior art sleeve. The fiber used in this Example was a single-mode fiber having an outer diameter of approximately 125 micrometers and a core diameter of approximately 8 micrometers. The light source for the measurements was a 1.3 micron wavelength light-emitting diode. Cylindrical plugs having a diameter of 100.6±0.05 mils (2.555 millimeters±1.27 micrometers) were attached to the ends of two lengths of fibers. The cylindrical portion of each plug was approximately 0.25 inches (6.35 mm) long. The inventive sleeve was approximately 0.4 inches (10.2 mm) long and had a thickness shown in Table 1, using the values corrected for initial curvature as shown. The split in the sleeve was about 20 mils (0.5 mm) wide, and the optional alignment flanges were about 35 mils (0.89 mm) high. This sleeve was made by transfer molding using a silica-filled (about 70% by weight) thermal-setting epoxy material (PLASKON Products, Inc., 2929B). This material has a modulus (E) of about $2 \times 10^6$ psi. A disc of this material, about 1 inch in diameter by ½ inch thick, was preheated to the softening point (about 212° F. for about 24 seconds) and then inserted in a transfer-molding die. It was cured at 330° F. for 4 minutes, ejected from the mold, and allowed to cool at room temperature. The mandrel of the mold was removed, and the sleeve was post-cured at 150° F. for 1 hour for improved dimensional stability. The connector loss, using the above-mentioned cylindrical plugs in the inventive sleeve, was measured for 148 such sleeves; the lateral surface of the plugs was wiped clean every 5 to 10 insertions. In this experiment, 90% of the sleeves gave insertion losses less than 0.6 dB, with the mean insertion loss being 0.34 dB and a standard deviation of 0.185 dB. For comparison, a typical prior art metal cylindrical sleeve having a constant wall thickness was measured. The metal sleeve was 450 mils long and had an inner diameter of 95 mils and an outer diameter of 120 mils. Thirty connections were made, and each was measured. The mean loss was found to be approximately 0.2 dB higher than that of the inventive sleeve. Furthermore, the standard deviation was increased by nearly a factor of 3.

While the cylindrical plugs typically connect to optical fibers, it is apparent that the inventive sleeve can be used in connecting an optical fiber to an optical device, including, for example, optical sources and optical detectors. The device can be mounted directly in the cylindrical plug, or connected thereto by a short length of optical fiber. While a single-mode optical fiber was utilized in the above Example, multimode fiber connections also benefit from the use of the inventive sleeve. The relatively low cost and ease of use of a molded plastic sleeve of the inventive design make it especially suitable for use in situations requiring a large density of connections, such as office-type information distribution systems.

What is claimed is:

1. An improved split sleeve adapted for use with cylindrical optical plugs,
   characterized in that
   the thickness (h) of said sleeve varies substantially according to the formula:

$$h^3 = h_o^3 \sin^2\left(\frac{\phi}{2}\right),$$

where $h_o$ is the thickness of the wall opposite the split, and $\phi$ is the angle subtended by a point in the wall with respect to the center of the split in a cross section of the sleeve.

2. An improved split sleeve adapted for use with cylindrical optical plugs,
   characterized in that
   the thickness (h=b−a) of said sleeve varies substantially according to the formula:

$$\frac{E\delta}{8a^3 p} = \sin^2\left(\frac{\phi}{2}\right) \frac{(b^2 - a^2) + 2b^2 \ln\frac{b}{a}}{(b^2 - a^2)^2 - 4a^2 b^2 \left(\ln\frac{b}{a}\right)^2}$$

where
a = inner radius of the sleeve wall;
b = outer radius of the sleeve wall;
$\phi$ = angle subtended by a point in the wall with respect to the center of the split in a cross section of the sleeve;
$\delta$ = diametral interference with said plugs;
p = pressure on the inside wall of the sleeve with said plugs inserted therein;
E = modulus of elasticity of sleeve material.

3. An improved split sleeve adapted for use with cylindrical optical plugs,
   characterized in that
   said sleeve has an outer surface described by a larger circle and an inner surface described by a smaller circle that is offset from said larger circle, as viewed in cross section.

4. An improved split sleeve adapted for use with cylindrical optical plugs
characterized in that
said improved sleeve has a varying wall thickness around its circumference, with said thickness being substantially less in the vicinity of the split than the thickness opposite said split, whereby the inner surface of said sleeve maintains a substantially circular shape when two cylindrical plugs are inserted therein.

5. The improved sleeve of claim 4 wherein said sleeve is molded of polymeric material.

6. The improved sleeve of claim 4 further comprising flanges near said split.

7. The improved sleeve of claim 4 wherein the alignment of two cylindrical plugs inserted therein is improved as compared to that provided by a sleeve made of the same material and having a constant wall thickness equal to the average wall thickness of said improved sleeve.

8. The improved sleeve of claim 4 wherein said improved sleeve contacts a greater surface area of two cylindrical plugs inserted therein, as compared to a sleeve made of the same material and having a constant wall thickness equal to the average wall thickness of said improved sleeve.

9. An optical connector comprising two cylindrical plugs inserted into the improved sleeve of claim 4.

* * * * *